United States Patent
Nobuta et al.

(10) Patent No.: US 7,169,509 B2
(45) Date of Patent: Jan. 30, 2007

(54) ELECTRODE AND ELECTROCHEMICAL CELL THEREWITH

(75) Inventors: Tomoki Nobuta, Miyagi (JP); Hiroyuki Kamisuki, Miyagi (JP); Masaya Mitani, Miyagi (JP); Shinako Kaneko, Miyagi (JP); Tetsuya Yoshinari, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 357 days.

(21) Appl. No.: 10/804,891

(22) Filed: Mar. 19, 2004

(65) Prior Publication Data

US 2004/0191607 A1    Sep. 30, 2004

(30) Foreign Application Priority Data

Mar. 27, 2003    (JP)    ............... 2003-087872

(51) Int. Cl.
  *H01M 4/58*    (2006.01)
  *H01M 4/60*    (2006.01)
  *H01M 4/80*    (2006.01)

(52) U.S. Cl. .................. 429/218.1; 429/213; 429/232; 429/236

(58) Field of Classification Search ............. 429/218.1, 429/213, 212, 232, 233, 235, 236
See application file for complete search history.

(56) References Cited

U.S. PATENT DOCUMENTS

| 5,225,296 A | 7/1993 | Ohsawa et al. ............. 429/218 |
| 5,582,937 A | 12/1996 | LaFollette .................. 29/623.1 |
| 6,465,041 B1 | 10/2002 | Frisk et al. ................. 427/228 |

FOREIGN PATENT DOCUMENTS

| JP | 59-146163 | 8/1984 |
| JP | 59-230257 | 12/1984 |
| JP | 2001-257133 | 9/2001 |
| JP | 2002-025868 | 1/2002 |
| JP | 2002-110178 | 4/2002 |

*Primary Examiner*—Patrick Joseph Ryan
*Assistant Examiner*—Thomas H. Parsons
(74) *Attorney, Agent, or Firm*—Knobbe Martens Olson & Bear LLP

(57) ABSTRACT

This invention provides an electrode comprising a porous conductive substrate as well as an electrode active material and a conductive auxiliary filled in the pores in the substrate. This electrode exhibits improved shape stability (strength), a lower resistivity and better response. This electrode can be used to provide an electrochemical cell capable of quick charge/discharge and exhibiting improved cycle properties.

26 Claims, 8 Drawing Sheets

(a)

(b)

FIG. 1
(a)
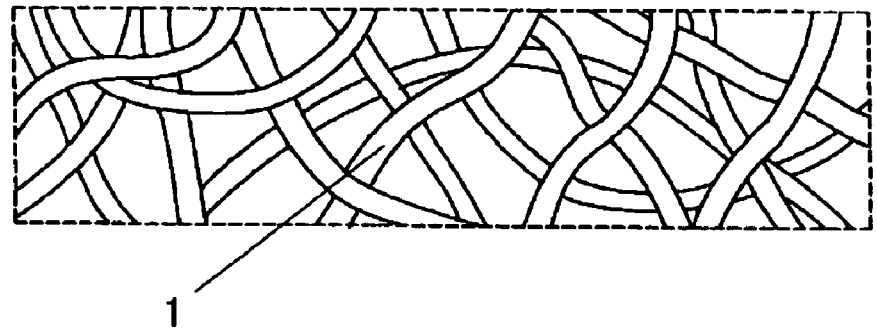
(b)
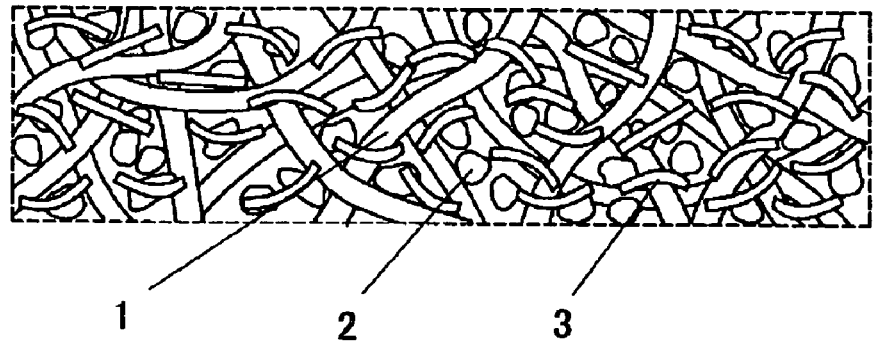

FIG. 2
(a)
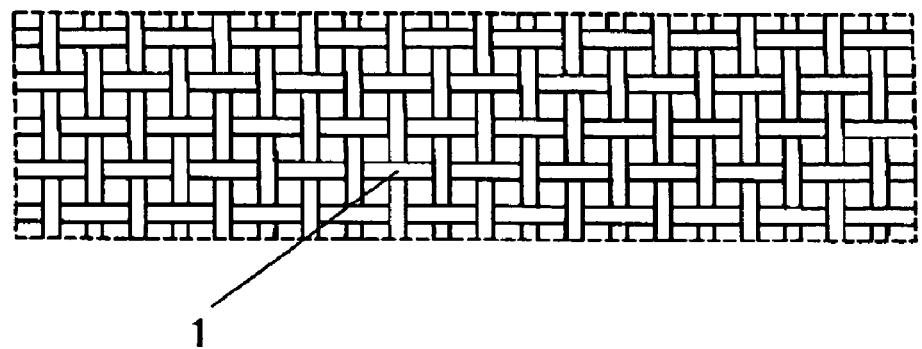
(b)
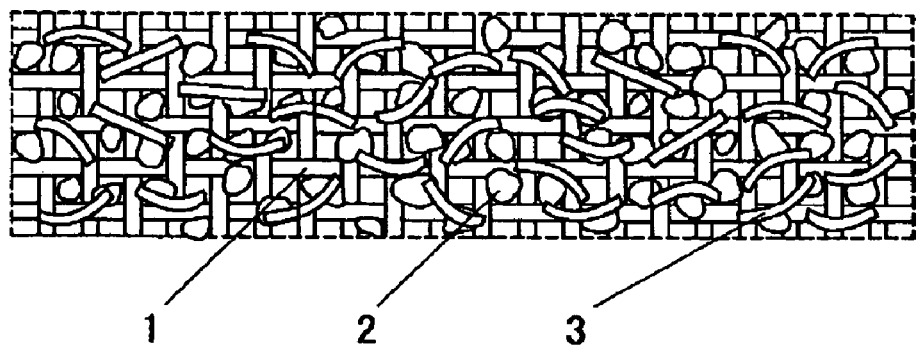

FIG. 3
(a)
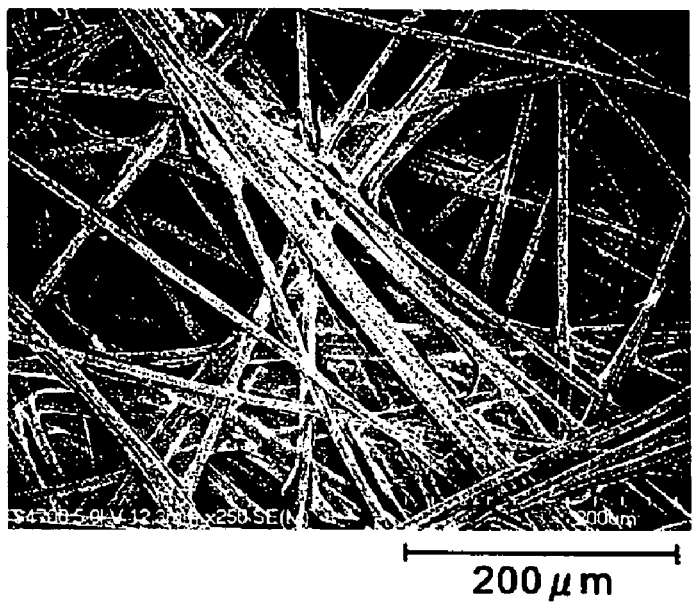
200 μm
(b)
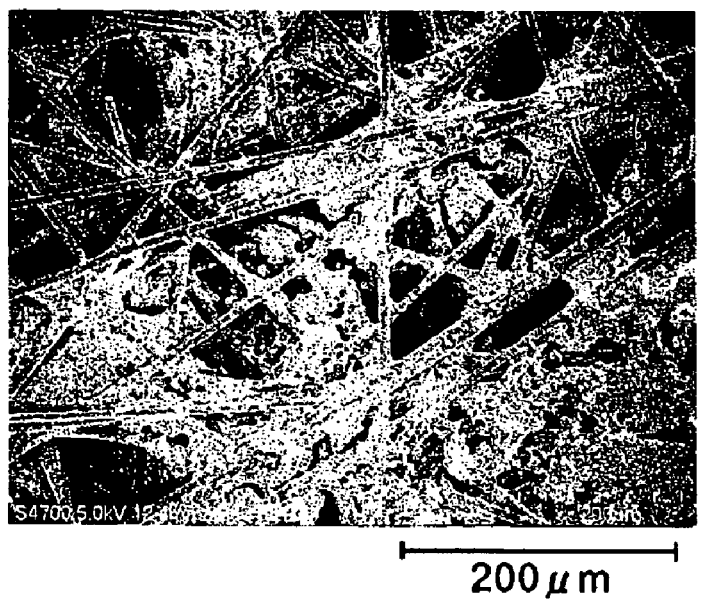
200 μm

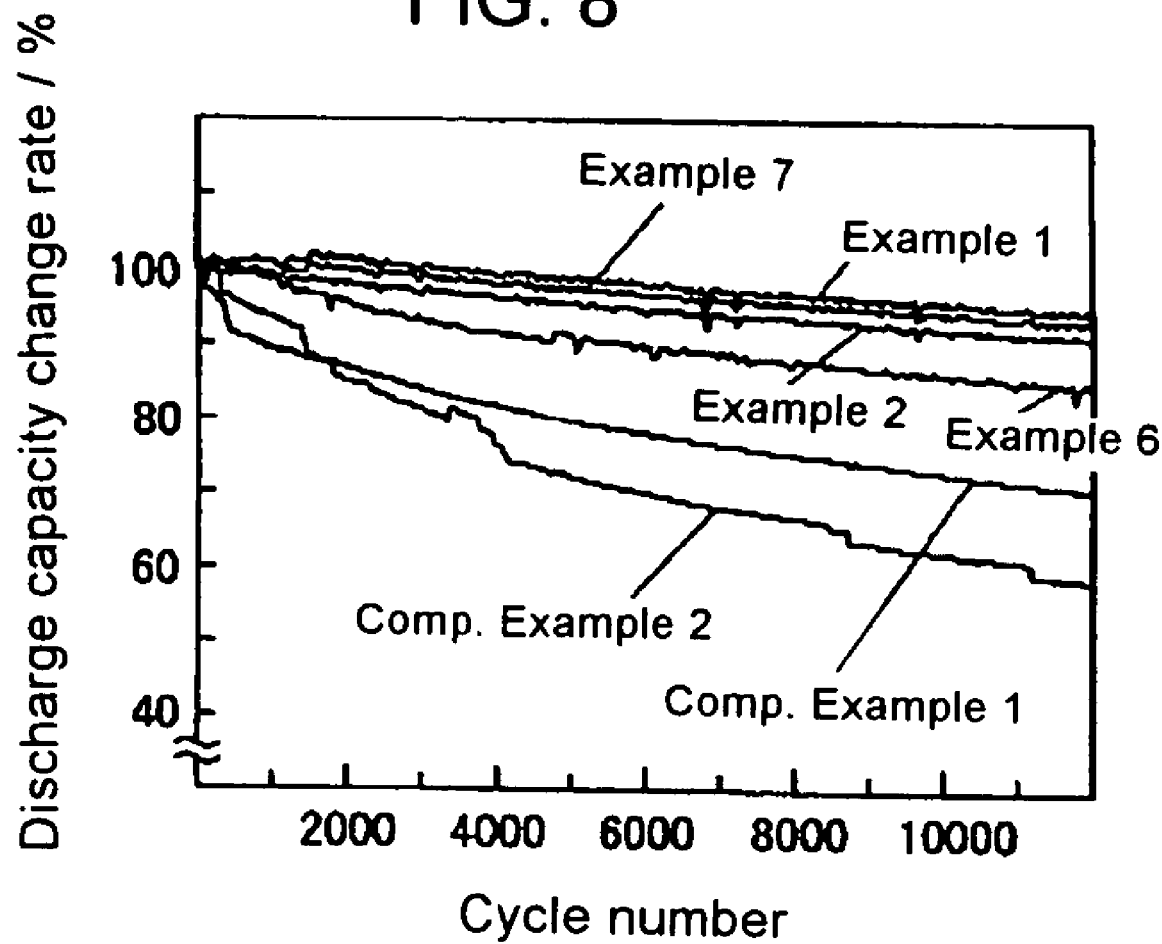

ELECTRODE AND ELECTROCHEMICAL CELL THEREWITH

BACKGROUND OF THE INVENTION

1. Field of the Invention

This invention relates to an electrode comprising a support for improving strength and conductivity and an electrochemical cell therewith such as a secondary battery and an electric double-layer capacitor.

2. Description of the Related Art

There have been suggested and practically used electrochemical cells such as secondary batteries and capacitors in which a proton-conducting polymer is used as an electrode active material. FIG. 4 shows a cross section of a conventional electrochemical cell.

As shown in FIG. 4, the conventional electrochemical cell has a configuration where a cathode 6 and an anode 7 containing a proton-conducting polymer as an active material are formed on a cathodic current collector 4 and an anodic current collector 5, respectively, these electrodes are combined via a separator 8 and only protons are involved as a charge carrier. The cell is filled with an aqueous or non-aqueous solution containing a proton-donating electrolyte as an electrolytic solution, and is sealed by a gasket 9.

The cathode 6 and the anode 7 are prepared using electrode materials including an electrode active material comprising, for example, a doped or undoped proton-conducting polymer powder as a main component, a conductive auxiliary and a binder. These electrodes can be formed by (1) a method comprising the steps of placing the electrode material in a mold with a predetermined size and molding it by a hot press to form an electrode, or (2) a method comprising the steps of depositing the slurry of the electrode materials on a current collector surface by screen printing and drying the resulting film to form an electrode. Then, a cathode and an anode thus formed are mutually faced via a separator to give an electrochemical cell.

Examples of a proton-conducting compound used as an electrode active material include π-conjugated polymers such as polyaniline, polythiophene, polypyrrole, polyacetylene, poly-p-phenylene, polyphenylene-vinylene, polyperinaphthalene, polyfuran, polyflurane, polythienylene, polypyridinediyl, polyisothianaphthene, polyquinoxaline, polypyridine, polypyrimidine, polyindole, polyaminoanthraquinone, polyimidazole and their derivatives; indole π-conjugated compound such as indole trimer compounds; quinones such as benzoquinone, naphthoquinone and anthraquinone; quinone polymers such as polyanthraquinone, polynaphthoquinone and polybenzoquinone where a quinone oxygen can be converted into a hydroxyl group by conjugation; and proton-conducting polymer prepared by copolymerizing two or more of the monomers giving the above polymers. These compounds may be doped to form a redox pair for exhibiting conductivity. These compounds are appropriately selected as a cathode and an anode active materials, taking a redox potential difference into account.

Known electrolytic solutions include an aqueous electrolytic solution consisting of an aqueous acid solution and a non-aqueous electrolytic solution comprising an electrolyte in an organic solvent. In an electrode comprising a proton-conducting compound, the former aqueous electrolytic solution is frequently used because it can give a high-capacity electrochemical cell. The acid used may be an organic or inorganic acid; for example, inorganic acids such as sulfuric acid, nitric acid, hydrochloric acid, phosphoric acid, tetrafluoroboric acid, hexafluorophosphoric acid and hexafluorosilicic acid and organic acids such as saturated monocarboxylic acids, aliphatic carboxylic acids, oxycarboxylic acids, p-toluenesulfonic acid, polyvinylsulfonic acid and lauric acid.

In the conventional method (1) for forming an electrode, preparation of a thinner electrode is difficult, an electrode resistivity is higher due to limitations in its shape, an electrochemical reaction is slower and the electrode exhibits poor quick charge-discharge behavior. In the conventional method (2) for forming an electrode, preparation of a slurry giving desired properties or selection of a binder is difficult and a manufacturing process becomes more complex for preparing an electrode with good properties.

Furthermore, an electrode prepared from the above slurry has a problem that breaks, cracks or detachment may occur during drying or impregnation of an electrolytic solution, leading to poor adhesiveness to a current collector and an increased contact resistance or an electrode resistance. The electrode also has a problem that in both conventional methods (1) and (2) for forming an electrode, expansion associated with an electrochemical reaction of a proton-conducting compound with a dopant and swelling due to impregnation of an electrolytic solution cause reduction in electrode strength and breaks and cracks, leading to an increased internal resistance and deteriorated cycle properties.

Japanese Laid-open Patent Publication No. 257133/2001 (Patent Reference 1) has disclosed an electrode where a layer comprising particulate and/or fibrous carbon having an ion-dissociating group and an electroconductive polymer is formed on a conductive substrate and has disclosed that a surfactant in a solution in which the above carbon is dispersed by the action of the surfactant is oxidized or reduced to precipitate the carbon on the surface of the conductive substrate and the conductive polymer is formed by electrolytic polymerization. It has also described that because of simultaneous improvement in electron conductivity and ion conductivity, the electrode exhibits a higher response speed and that the electrode can be used to provide an electrochemical capacitor having a larger output density.

Japanese Laid-open Patent Publication No. 25868/2002 (Patent Reference 2) has disclosed an electric double layer capacitor where at least one of a pair of polarizable electrodes is made of a conductive polymer complexed on particulate or fibrous charcoal by electrolytic polymerization. It has described that according to the technique, conductivity can be improved, resulting in a high-capacity electric double layer capacitor allowing high-speed charge and discharge.

According to the methods disclosed in these patent references, conductivity of an electrode can be improved, and thus charge-discharge properties of an electrochemical cell comprising such an electrode can be improved. However, it leads to a complex manufacturing process and an increased production cost.

In Patent Reference 1, a conductive substrate is made of a metal such as a stainless steel as described in Examples therein. Patent Reference 2 has described that an electrode for polymerization (substrate) used in electrolytic polymerization is made of a conductor such as a metal and graphite and a conductive polymer composite formed is used as a polarized electrode as it is or after removing it from the electrode for polymerization.

As described above, the first problem in a conventional process for forming an electrode is that since a thinner electrode cannot be formed by an electrode-forming process employing press molding, an electrode resistivity is increased, leading to deteriorated response in an electrochemical reaction. The second problem is that since adhesiveness between an electrode and a current collector is inadequate or an electrode itself has poor strength according to the electrode-forming process employing a coating by screen-printing, a film electrode exhibiting good properties cannot be prepared. Furthermore, the third problem is that an electrode exhibits poor shape stability, i.e., strength during production or an electrochemical reaction.

SUMMARY OF THE INVENTION

An objective of this invention is to provide a thin electrochemical cell capable of quick charge/discharge and exhibiting adequate cycle properties, as well as an electrode adequately improved strength and conductivity for forming such an electrochemical cell.

This invention has been achieved by investigating the use of a support consisting of a porous conductive substrate having a three-dimensional structure where conductive fibers are interlaced as an electrode component for solving the above problems.

According to a first aspect of the present invention, there is provided an electrode comprising a porous conductive substrate as well as an electrode active material and a conductive auxiliary filled in the pores in the substrate.

According to a second aspect of the present invention, there is provided the electrode as described above, wherein the porous conductive substrate is a carbon fiber sheet.

According to a third aspect of the present invention, there is provided any of the electrodes as described, wherein the porous conductive substrate before filling has a porosity of 50 to 85%.

According to a fourth aspect of the present invention, there is provided any of the electrodes as described above, wherein the porous conductive substrate has a filling rate of 5% or more.

According to a fifth aspect of the present invention, there is provided any of the electrodes as described above, wherein a rate of the conductive auxiliary to the electrode active material is 50% by weight or less.

According to a sixth aspect of the present invention, there is provided any of the electrodes as described above, wherein the electrode active material is a proton-conducting compound which is subjected to an oxidation-reduction reaction with ions in an electrolyte.

According to a seventh aspect of the present invention, there is provided any of the electrodes as described above, comprising at least one of particulate carbon and fibrous carbon as the conductive auxiliary.

According to a eighth aspect of the present invention, there is provided an electrochemical cell, wherein at least one of electrodes is any of the electrodes as described above. The electrochemical cell is suitable as a secondary battery or capacitor.

This invention can provide an electrochemical cell capable of quick charge/discharge and exhibiting good cycle properties and electrode strength because an electrode having improved electron conductivity and a lower resistivity can be provided by filling pores in a porous conductive substrate as a support with an electrode material, because an electrode exhibiting good shape stability (strength) can be provided by using a support consisting of a porous conductive substrate and because by using a porous conductive substrate, the amount of an electrolytic solution impregnated can be increased to improve ion conductivity within the electrode.

This invention can also provide an electrode exhibiting improved shape stability (strength), a lower resistivity and better response than an electrode according to the prior art. Furthermore, a thickness of the porous conductive substrate as a support can be selected such that an electrode having an appropriate film thickness can be readily prepared; in particular, an electrode can be easily made thinner, an electrode resistivity can be reduced and an electrochemical cell can be readily made thinner.

BRIEF DESCRIPTION OF THE DRAWINGS

FIG. 1 schematically shows the states after and before filling pores in a non-woven carbon-fiber fabric with an indole trimer compound and fibrous carbon. FIGS. 1(a) and (b) show the states before and after filling, respectively.

FIG. 2 schematically shows the states after and before filling pores in a plain-woven carbon-fiber fabric with an indole trimer compound and fibrous carbon. FIGS. 2(a) and (b) show the states before and after filling, respectively.

FIG. 3 shows scanning electron microscope images after and before filling pores in a non-woven carbon-fiber fabric with an indole trimer compound and fibrous carbon. FIGS. 3(a) and (b) show the states before and after filling, respectively.

FIG. 8 shows cycle properties of Examples 1, 2, 6 and 7 and Comparative Examples of 1 and 2.

DETAILED DESCRIPTION OF PREFERRED EMBODIMENTS

Figure 4:
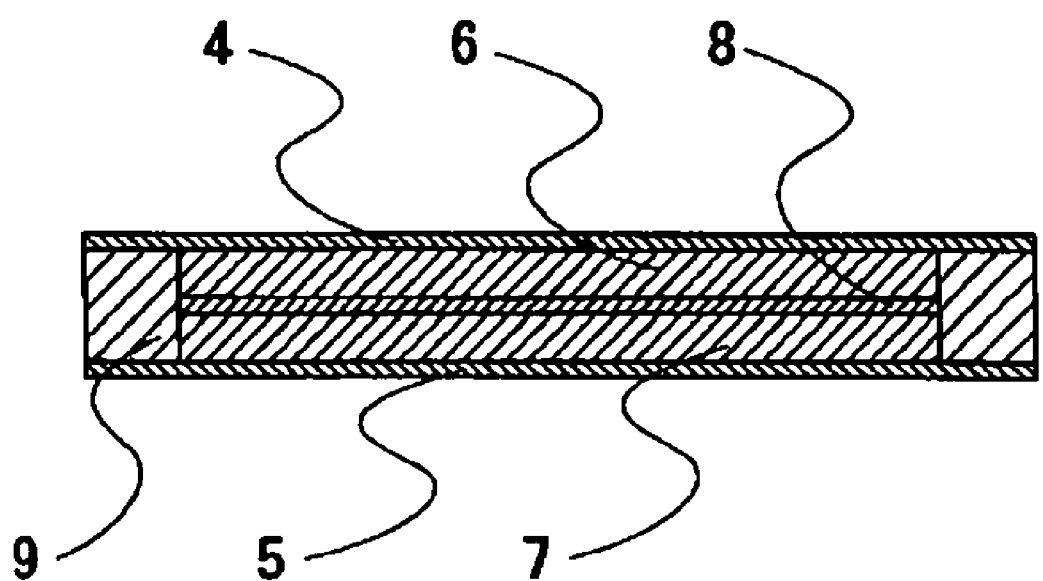
FIG. 4 is a schematic cross section of an electrochemical cell according to the prior art.

An electrode according to this invention comprises a porous conductive substrate as a support, whose pores are filled with a mixture comprising an electrode active material and a conductive auxiliary. The mixture may, as necessary, comprise a binder. This configuration may provide an electrode having a lower resistivity and higher strength because the support improves electrode strength and the support itself is conductive.

A porous conductive substrate constituting such a support may be a sheet; suitably a sheet having a three-dimensional structure where conductive fibers are interlaced, including non-woven carbon fiber fabrics, plain-woven carbon fiber fabrics and other porous sheets.

It is desirable that the porous conductive substrate has a porosity of 50 to 85% because an excessively lower porosity may lead to an inadequate amount of an electrode active material or conductive auxiliary filling the pores while an excessively higher porosity may reduce strength to an extent that the porous substrate does not function as a support.

The term "porosity" (percentage of void, porosity rate) as used herein refers to a ratio of the total volume of pores to the total volume of the porous conductive substrate. A porosity may be determined by a water saturation method or a mercury penetration method. The water saturation method determines a weight difference in the substrate between when the pores are vacant (dried) and when the pores are filled with water (water-containing) for estimating a porosity. The mercury penetration method determines based on the Washburn's law using a mercury porometer for estimating a porosity.

A filling rate of the pores in the porous conductive substrate is preferably 5% or more, more preferably 10% or more for satisfactorily achieving the desired battery properties while being preferably 80% or less, more preferably 60% or less, particularly preferably 40% or less in the light of an amount of the electrolytic solution impregnated and shape stability of the electrode.

The term "filling rate" as used herein refers to a degree that the electrode material occupies the pores in the porous conductive substrate. The filling rate (%) can be calculated according to the following equation from a density A of the electrode after preparation and a density Y of the porous conductive substrate used for the electrode.

$$100 \times (A-Y)/Y$$

In the calculation, the electrode prepared must not be thicker than the porous conductive substrate used for the electrode. In other words, the electrode material around the porous conductive substrate (except pores) must not contribute to calculation of a filling rate. A density (g/cm$^3$) herein is a weight per a unit volume including pores, i.e., a so-called apparent density.

A blend ratio of the conductive auxiliary to the electrode active material is preferably 50 wt % or less because an excessive amount of the conductive auxiliary may lead to substantially impractical properties as an electrode. The blend ratio is preferably 5 wt % or more, more preferably 10 wt % or more in the light of endowing the electrode with adequate conductivity.

An electrode active material is preferably a proton-conducting compound in the light of electrochemical properties such as a capacity. A proton-conducting compound is an organic compound (including a polymer) which may be subjected to an oxidation-reduction reaction with ions of an electrolyte and can store electrochemical energy. Such a proton-conducting compound may be any of known compound conventionally used; for example, π-conjugated polymers such as polyaniline, polythiophene, polypyrrole, polyacetylene, poly-p-phenylene, polyphenylene-vinylene, polyperinaphthalene, polyfuran, polyflurane, polythienylene, polypyridinediyl, polyisothianaphthene, polyquinoxaline, polypyridine, polypyrimidine, polyindole, polyaminoanthraquinone, polyimidazole and their derivatives; indole π-conjugated compound such as indole trimer compounds; quinones such as benzoquinone, naphthoquinone and anthraquinone; quinone polymers such as polyanthraquinone, polynaphthoquinone and polybenzoquinone where a quinone oxygen can be converted into a hydroxyl group by conjugation; and proton-conducting polymer prepared by copolymerizing two or more of the monomers giving the above polymers. These compounds may be doped to form a redox pair for exhibiting conductivity (doping). These compounds are appropriately selected as a cathode and an anode active materials, taking a redox potential difference into account.

Preferable examples of a proton-conducting compound include π-conjugated compounds or polymers having nitrogen atom, quinone compounds and quinone polymers. Among these, a preferable cathode active material (positive active material) is an indole trimer compound and a preferable anode active material (negative active material) is a quinoxaline polymer.

A suitable conductive auxiliary is at least one of particulate carbon and fibrous carbon.

Examples of a binder which can be used include conventionally used and known resin binders such as polyvinylidene fluoride.

An electrode active material and a conductive auxiliary used for an electrode of this invention may be, during preparation, dispersed or dissolved in a solvent and stirred such that secondary particle structure of the dispersed particles is broken to give a slurry containing particles with a minimum size (primary particle system), in order to give a more homogeneous mixture. Pores in a support are filled with the mixture and the solvent is then removed to solidify the mixture to substantially maximize contact areas between the electrode active materials, between the conductive auxiliaries and between the electrode active material and the conductive auxiliary. Thus, an electrode with a low resistivity can be provided and electron conductivity can be significantly improved.

The slurry mixture may be any of the types that the active material is completely dissolved while the conductive auxiliary is dispersed; that part of the active material (for example, several wt % to several tens wt %) is dissolved and the remaining is dispersed while the conductive auxiliary is dispersed; and that the active material and the conductive auxiliary are dispersed.

A solvent used for preparation of the slurry mixture may be any of those which can easily disperse an electrode material insoluble in the solvent and are inert to the electrode material.

An electrode of this invention comprises a porous conductive substrate such as a woven or non-woven carbon-material fabric as a support component, so that a large amount of the electrolytic solution is impregnated. Thus, ion conductivity within the electrode is improved, compared with an electrode according to the prior art.

An electrode of this invention comprises a porous conductive substrate as a support component whose pores are filled with the electrode active material and the conductive auxiliary. An electrode strength may be therefore improved, depending on the strength of the porous conductive substrate. As a result, shape stability of the electrode may be improved and swelling of the electrode during impregnation of the electrolytic solution or associated with an electrochemical reaction with a dopant may be prevented. Consequently, defects such as cracks and breaks due to swelling of the electrode may be prevented.

Thus, increase in a resistance of the electrode may be prevented, resulting in prevention of increase in an internal resistance of the electrochemical cell. These effects may, therefore, provide an electrode exhibiting quite good response and an electrochemical cell exhibiting improved properties with the electrode.

In an electrochemical cell comprising the above electrode exhibiting good response, a time that elapsed before full charge may be reduced during applying a voltage and a voltage drop during discharge may be reduced, so that voltage-variation associated with charge/discharge may be reduced. Thus, deterioration of the electrode active material itself and gas evolution due to decomposition of the electrolytic solution can be inhibited to improve cycle properties in charge/discharge. Particularly, properties in serially laminated electrochemical cells may be significantly improved because reduced voltage-variation may contribute to keeping proper voltage balance.

This invention will be more specifically described with reference to an exemplary electrochemical cell in which electrode active materials in a cathode and an anode are an indole π-conjugated compound such as an indole trimer compound and a quinoxaline polymer such as polyphenylquinoxaline, respectively.

An electrochemical cell according to this invention is preferably that wherein only protons act as a charge carrier in a redox reaction associated with charge and discharge in both electrodes; more specifically that comprising an electrolyte containing a proton source wherein a proton concentration in the electrolyte and an operating voltage are controlled such that only bonding and elimination of protons in the electrode active material can be involved in electron transfer in accordance with a redox reaction associated with charge and discharge in both electrodes.

An indole trimer compound has a fused polycyclic structure comprising a six-membered ring formed by atoms at 2- and 3-positions in three indole rings. The indole trimer compound can be prepared from one or more compounds selected from indole and indole derivatives or alternatively indoline and its derivatives, by a known electrochemical or chemical process.

Examples of such indole trimer compound include those represented by the following chemical formula:

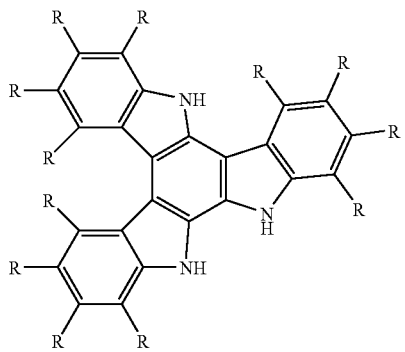

wherein Rs independently represent hydrogen, hydroxyl, carboxyl, nitro, phenyl, vinyl, halogen, acyl, cyano, amino, trifluoromethyl, sulfonic, trifluoromethylthio, carboxylate, sulfonate, alkoxyl, alkylthio, arylthio, alkyl having 1 to 20 carbon atoms optionally substituted with these substituents, aryl having 6 to 20 carbon atoms optionally substituted with these substituents, or heterocyclic residue.

In the formula, examples of halogen in R include fluorine, chlorine, bromine and iodine. Examples of alkyl in R in the formula include methyl, ethyl, propyl, isopropyl, n-butyl, s-butyl, isobutyl, t-butyl, n-pentyl, n-hexyl, n-heptyl and n-octyl. Acyl in R in the formula is a substituent represented by —COX, wherein X may be alkyl as described above. Alkoxyl in R in the formula is a substituent represented by —OX, wherein X may be alkyl as described above. Examples of aryl in R in the formula include phenyl, naphthyl and anthryl. The alkyl moiety in alkylthio in R in the formula may be selected from those described above. The aryl moiety in arylthio in R in the formula may be selected from those described above. Examples of heterocyclic residue in R in the formula include 3- to 10-membered cyclic radicals having 2 to 20 carbon atoms and 1 to 5 heteroatoms which may be selected from oxygen, sulfur and nitrogen.

A quinoxaline polymer is a polymer having a unit containing a quinoxaline skeleton, and may be a polymer having a quinoxaline structure represented by the following chemical formula:

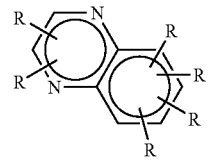

wherein Rs may be contained as a linker in a main chain or as a side chain group; Rs independently represent hydrogen, hydroxyl, amino, carboxyl, nitro, phenyl, vinyl, halogen, acyl, cyano, trifluoromethyl, sulfonyl, sulfonic, trifluoromethylthio, alkoxyl, alkylthio, arylthio, carboxylate, sulfonate, alkyl having 1 to 20 carbon atoms optionally substituted with these substituents, aryl having 6 to 20 carbon atoms optionally substituted with these substituents, or heterocyclic residue.

In the formula, examples of halogen in R include fluorine, chlorine, bromine and iodine. Examples of alkyl in R in the formula include methyl, ethyl, propyl, isopropyl, n-butyl, s-butyl, isobutyl, t-butyl, n-pentyl, n-hexyl, n-heptyl and n-octyl. Acyl in R in the formula is a substituent represented by —COX, wherein X may be alkyl as described above. Alkoxyl in R in the formula is a substituent represented by —OX, wherein X may be alkyl as described above. Examples of aryl in R in the formula include phenyl, naphthyl and anthryl. The alkyl moiety in alkylthio in R in the formula may be selected from those described above. The aryl moiety in arylthio in R in the formula may be selected from those described above. Examples of heterocyclic residue in R in the formula include 3- to 10-membered cyclic radicals having 2 to 20 carbon atoms and 1 to 5 heteroatoms which may be selected from oxygen, sulfur and nitrogen.

A preferable quinoxaline polymer is a polymer containing 2,2'-(p-phenylene)diquinoxaline skeleton and may be a polyphenylquinoxaline represented by the following formula:

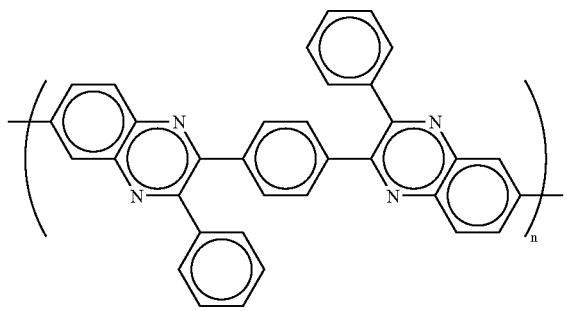

wherein n represents a positive integer.

A conductive auxiliary in a cathode (positive electrode) may be, for example, fibrous carbon with an average diameter of 150 nm and an average length of 10 to 20 μm prepared by vapor growth (Showa Denko K. K.: VGCF (Trademark); hereinafter, referred to as "fibrous carbon") and a binder may be polyvinylidene fluoride (hereinafter, referred to as "PVDF"). For example, an indole trimer compound, fibrous carbon and PVDF are sequentially weighted and dry-blended using a blender at a ratio of 69/23/8, to prepare a material mixture for a cathode. Since comprising a porous conductive substrate as a support as described above, an electrode according to this invention has good shape stability. Thus, a binder may not be necessarily used.

Predetermined amounts of the material mixture for a cathode and dimethylformamide as a solvent (hereinafter, referred to as "DMF) are weighed, mixed and stirred at an ambient temperature until an appearance becomes homogeneous, to obtain a slurry. Although DMF is herein used, a solvent may be any of organic solvents which may easily disperse a cathode material insoluble in the solvent used.

The slurry may be used for filling pores in a non-woven carbon fabric (porous conductive substrate) with, for example, a porosity of 78% and a thickness of 80 μm, to give a cathode having, for example, a filling rate of about 30%. Filling may be effectively conducted by a method where filling and drying are conducted using a squeegee and these treatments are repeated as necessary or a method where a slurry is impregnated into a support under a pressure.

FIG. 1 schematically shows the states after and before filling pores in a non-woven carbon-fiber fabric with an indole trimer compound and fibrous carbon. FIGS. 1(a) and (b) show the states before and after filling, respectively. In FIG. 1, symbols indicate the followings; 1: carbon fiber constituting a non-woven carbon-fiber fabric, 2: indole trimer compound, 3: fibrous carbon.

FIG. 2 schematically shows the states after and before filling pores in a plain woven carbon-fiber fabric with an indole trimer compound and fibrous carbon. FIGS. 2(a) and (b) show the states before and after filling, respectively. The symbols in FIG. 2 also are as described for FIG. 1, i.e., 1: carbon fiber constituting a plain woven carbon-fiber fabric, 2: indole trimer compound, 3: fibrous carbon.

A conductive auxiliary in an anode (negative electrode) may be, for example, highly conductive Carbon Black (Ketjen Black). For example, polyphenylquinoxaline as an electrode active material and Ketjen Black are sequentially weighed and mixed at a ratio of 75/25 by weight. Using m-cresol as a blending solvent, pores in a porous conductive substrate may be filled with the resulting powder as an anode material as described for the cathode, to prepare an anode.

An electrochemical cell of this invention may have a basic configuration as shown in, for example, FIG. 4, where a cathode 6 comprising a proton-conducting compound as an electrode active material and an anode 7 are formed on a cathodic current collector 4 and an anodic current collector 5, respectively, and these electrodes are laminated via a separator 8. The cell is filled with an electrolytic solution containing a proton source and is sealed by a gasket 9. The electrochemical cell may allow only protons to function as a charge carrier.

An electrochemical cell may have a conventional external appearance such as, but not limited to, a coin and a laminate. A separator may be a conventional polyolefin porous film or cation-exchanger membrane, preferably having a thickness of 10 to 50 μm.

A proton source in the proton-source-containing (proton donating) electrolyte may be an inorganic or organic acid. Examples of an inorganic acid include sulfuric acid, nitric acid, hydrochloric acid, phosphoric acid, tetrafluoroboric acid, hexafluorophosphoric acid and hexafluorosilicic acid. Examples of an organic acid include saturated monocarboxylic acids, aliphatic carboxylic acids, oxycarboxylic acids, p-toluenesulfonic acid, polyvinylsulfonic acid and lauric acid. Among these proton-source-containing electrolytes, an aqueous acid-containing solution is preferable and an aqueous solution of sulfuric acid is more preferable.

A proton concentration in an electrolytic solution containing a proton source is preferably $10^{-3}$ mol/L or more, more preferably $10^{-1}$ mol/L or more in the light of reactivity of the electrode materials while being preferably 18 mol/L or less, more preferably 7 mol/L or less in the light of deterioration in activity of the electrode materials and prevention of dissolution.

EXAMPLES

With reference to a secondary battery as a specific example, this invention will be more specifically described. The above basic configuration may be appropriately adapted to be suitable as a capacitor.

Example 1

A cathode active material was 5-cyanoindole trimer compound as a proton-conducting compound, a cathode conductive auxiliary was fibrous carbon (VGCF); and a binder was PVDF with an average molecular weight of 1,100. These were sequentially weighed to a weight ratio of 69/23/8 and mixed by stirring in a blender.

Then, 10 mg of the mixture powder was stirred in 1 mL of DMF for 5 min at an ambient temperature to give a homogeneously dispersed slurry. A porous conductive substrate as a support for an electrode was a non-woven carbon-fiber fabric with a porosity of 45% and a thickness of 80 μm. Pores in the porous conductive substrate were filled with the resulting slurry using a squeegee to give a cathode with a filling rate of 12% and a thickness of 100 μm, which was then cut into a predetermined shape for use.

Then, polyphenylquinoxaline, a proton-conducting polymer, was used as an anode active material and Ketjen Black (Ketjen Black International Company, EC-600JD) was used a conductive auxiliary. These were sequentially weighed at a weight ratio of 71/29 and mixed by stirring in a blender. Then, it was processed as described for the cathode, to give an anode with a filling rate of 12% and a thickness of 100 μm. A mixing solvent was m-cresol. The resulting anode was cut into a predetermined shape for use.

Using a 20 wt % aqueous solution of sulfuric acid as an electrolytic solution and a polyolefin porous film with a thickness of 15 μm as a separator, the cathode and the anode were put together such that the electrode surfaces faced to each other. The laminate was packaged in a gasket to give an electrochemical cell for a secondary battery as shown in FIG. 4.

The filling rate was calculated from a density of the electrode and a known porosity of the porous conductive substrate.

FIG. 3 shows images taken by scanning electron microscopy after and before filling pores in a non-woven carbon-fiber fabric as a porous conductive substrate with an indole trimer compound and fibrous carbon. FIGS. 3(a) and (b) show the states before and after filling, respectively. As seen from FIG. 3, the pores are filled with the indole trimer compound and the fibrous carbon. Although a non-woven carbon-fiber fabric with a thickness of 80 μm was selected in this example, any fabric may be used as long as it has a suitable porosity (preferably, a porosity of 50 to 85%) and a resistivity comparable to or less than the carbon fiber.

Example 2

An electrochemical cell for a secondary battery was prepared as described in Example 1, except that a non-woven carbon fiber fabric with a porosity of 78% and a thickness of 80 μm was used as a porous conductive substrate for a support in an electrode. The resulting cathode had a filling rate of 20% and a thickness of 100 μm while the anode had a filling rate of 20% and a thickness of 100 μm.

Example 3

As described in Example 2, a non-woven carbon fiber fabric with a porosity of 78% and a thickness of 80 μm was used as a porous conductive substrate for a support in an electrode. A slurry prepared as described in Example 1 was used in impregnation under a pressure to give a cathode with a filling rate of 30% and a thickness of 100 μm. Similarly, an anode with a filling rate of 30% and a thickness of 100 μm was prepared. As described in Example 1 for the other conditions, an electrochemical cell for a secondary battery was prepared.

Example 4

An electrochemical cell for a secondary battery was prepared as described in Example 1, except that a non-woven carbon fiber fabric with a porosity of 87% and a thickness of 80 μm was used as a porous conductive substrate for a support in an electrode. The resulting cathode had a filling rate of 25% and a thickness of 100 μm while the anode had a filling rate of 25% and a thickness of 100 μm.

Example 5

An electrochemical cell for a secondary battery was prepared as described in Example 1, except that a non-woven carbon fiber fabric with a porosity of 78% and a thickness of 30 μm was used as a porous conductive substrate for a support in an electrode. The resulting cathode had a filling rate of 20% and a thickness of 50 μm while the anode had a filling rate of 20% and a thickness of 50 μm.

Example 6

A cathode and an anode were prepared as described in Example 2. Three pieces of each electrode were separately laminated to prepare a cathode and an anode with a thickness of 300 μm. As described in Example 1 for the other conditions, an electrochemical cell for a secondary battery was prepared.

Example 7

A cathode active material was 5-cyanoindole trimer compound as a proton-conducting compound, a conductive auxiliary was fibrous carbon (VGCF); and a binder was PVDF with an average molecular weight of 1,100. These were sequentially weighed to a weight ratio of 40/52/8 and mixed by stirring in a blender. A porous conductive substrate for a support was as described in Example 2. As described in Example 1 for the other conditions, a cathode with a filling rate of 20% and a thickness of 100 μm was prepared.

Then, polyphenylquinoxaline, a proton-conducting polymer, was used as an anode active material and Ketjen Black (Ketjen Black International Company, EC-600JD) was used as a conductive auxiliary. These were sequentially weighed at a weight ratio of 40/60 and mixed by stirring in a blender. A porous conductive substrate for a support was as described in Example 2. As described in Example 1 for the other conditions, an anode with a filling rate of 20% and a thickness of 100 μm was prepared.

An electrochemical cell for a secondary battery was prepared as described in Example 1, except using the cathode and the anode thus prepared.

Comparative Example 1

In Comparative Example 1, an electrode was formed by screen printing. A cathode active material was 5-cyanoindole trimer compound as a proton-conducting compound, a conductive auxiliary was fibrous carbon (VGCF); and a binder was PVDF with an average molecular weight of 1,100. These were sequentially weighed to a weight ratio of 69/23/8 and mixed by stirring in a blender.

Then, 10 mg of the mixture powder was stirred in 1 mL of DMF for 5 min at an ambient temperature to give a homogeneously dispersed slurry. It was directly applied on a current collector by screen printing to form a cathode with a thickness of 100 μm.

Then, polyphenylquinoxaline, a proton-conducting polymer, was used as an anode active material and Ketjen Black (Ketjen Black International Company, EC-600JD) was used as a conductive auxiliary. These were sequentially weighed at a weight ratio of 71/29 and mixed by stirring in a blender. Then, it was processed as described for the cathode, to give an anode with a thickness of 100 μm. A mixing solvent was m-cresol.

An electrochemical cell for a secondary battery was prepared as described in Example 1, except using these electrodes.

Comparative Example 2

In Comparative Example 2, an electrode was formed by hot press molding. A cathode active material was 5-cyanoindole trimer compound as a proton-conducting compound, a conductive auxiliary was fibrous carbon (VGCF); and a binder was PVDF with an average molecular weight of 1,100. These were sequentially weighed to a weight ratio of 69/23/8 and mixed by stirring in a blender. It was shaped by a hot press into a sheet with a thickness of 300 μm, which was then cut into a predetermined size to obtain a cathode.

Then, polyphenylquinoxaline, a proton-conducting polymer, was used as an anode active material and Ketjen Black (Ketjen Black International Company, EC-600JD) was used as a conductive auxiliary. These were sequentially weighed at a weight ratio of 71/29 and mixed by stirring in a blender. It was shaped by a hot press into a sheet with a thickness of 300 μm, which was then cut into a predetermined size to obtain an anode.

An electrochemical cell for a secondary battery was prepared as described in Example 1, except using these electrodes.

Table 1 summarizes the data on the conditions for forming an electrode, a thickness of a porous conductive substrate as a support, a thickness of an electrode, a porosity of a support and a filling rate of an electrode material in Examples and Comparative Examples. Table 2 summarizes a ratio of materials for an electrode and properties as a secondary battery. An energy capacity for an electrochemical cell in Table 2 is a converted value per 20 mg of an electrode weight, which was determined by using an electrode with a given constant area.

TABLE 1

| | Filling method | Support thickness/ Electrode thickness [μm] | Support porosity [%] | Filling rate [%] |
|---|---|---|---|---|
| Example | | | | |
| 1 | Squeegee | 80/100 | 45 | 12 |
| 2 | Squeegee | 80/100 | 78 | 20 |
| 3 | Impregnation | 80/100 | 78 | 30 |
| 4 | Squeegee | 80/100 | 87 | 25 |
| 5 | Squeegee | 30/50 | 78 | 20 |
| 6 | Squeegee | 80 × 3/300 | 78 | 20 |
| 7 | Squeegee | 80/100 | 78 | 20 |
| Comp. Example | | | | |
| 1 | Screen printing | 100 | — | — |
| 2 | Hot press | 300 | — | — |

TABLE 2

| | Mixing wt ratio (Active material/ Conductive auxiliary) | | Energy density [mAh/Active material wt] | Electrochemical cell energy capacity [mAh] |
|---|---|---|---|---|
| | Cathode | Anode | | |
| Example | | | | |
| 1 | 69/23 | 71/29 | 91.7 | 1.1 |
| 2 | 69/23 | 71/29 | 91.7 | 1.8 |
| 3 | 69/23 | 71/29 | 91.7 | 2.8 |
| 4 | 69/23 | 71/29 | 91.7 | 2.3 |
| 5 | 69/23 | 71/29 | 105.6 | 2.1 |
| 6 | 69/23 | 71/29 | 91.7 | 1.8 |
| 7 | 40/52 | 40/60 | 91.7 | 1.0 |
| Comp. Example | | | | |
| 1 | 69/23 | 71/29 | 72.1 | 1.4 |
| 2 | 69/23 | 71/29 | 51.2 | 1.0 |

Figure 5:
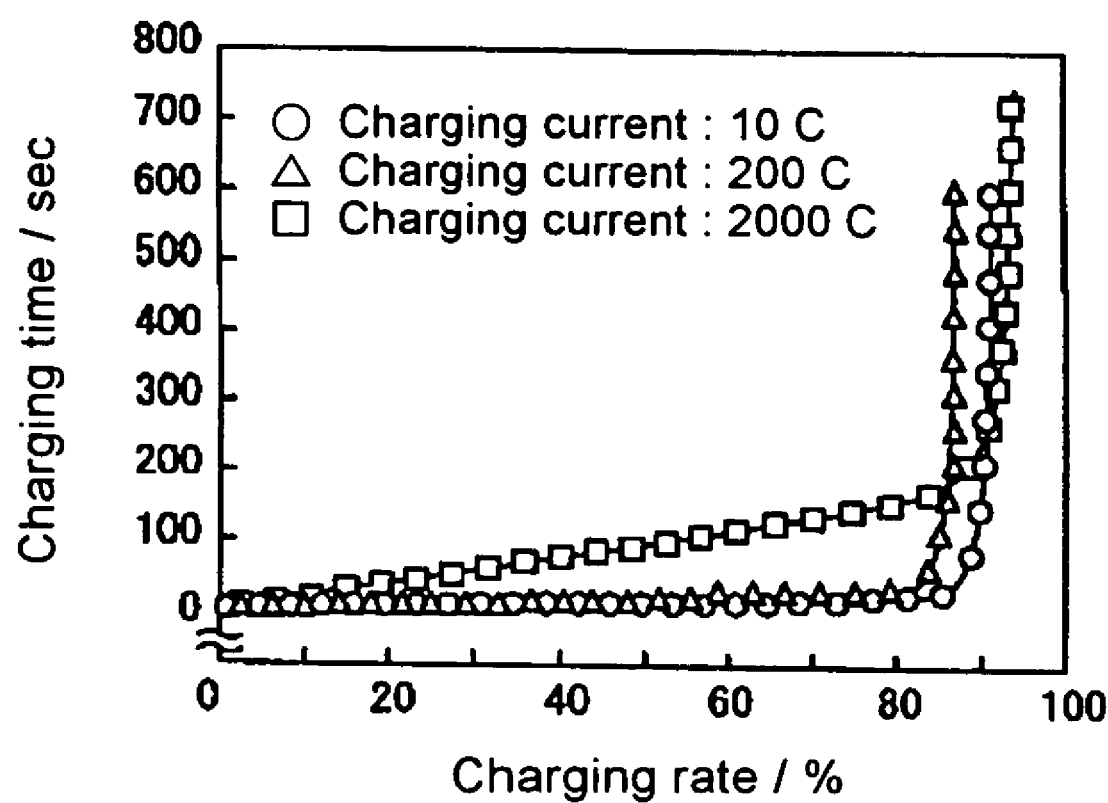
FIG. 5 shows a relationship between a charging rate and a charging time when varying a current value in an electrochemical cell in Example 1.
Figure 6:
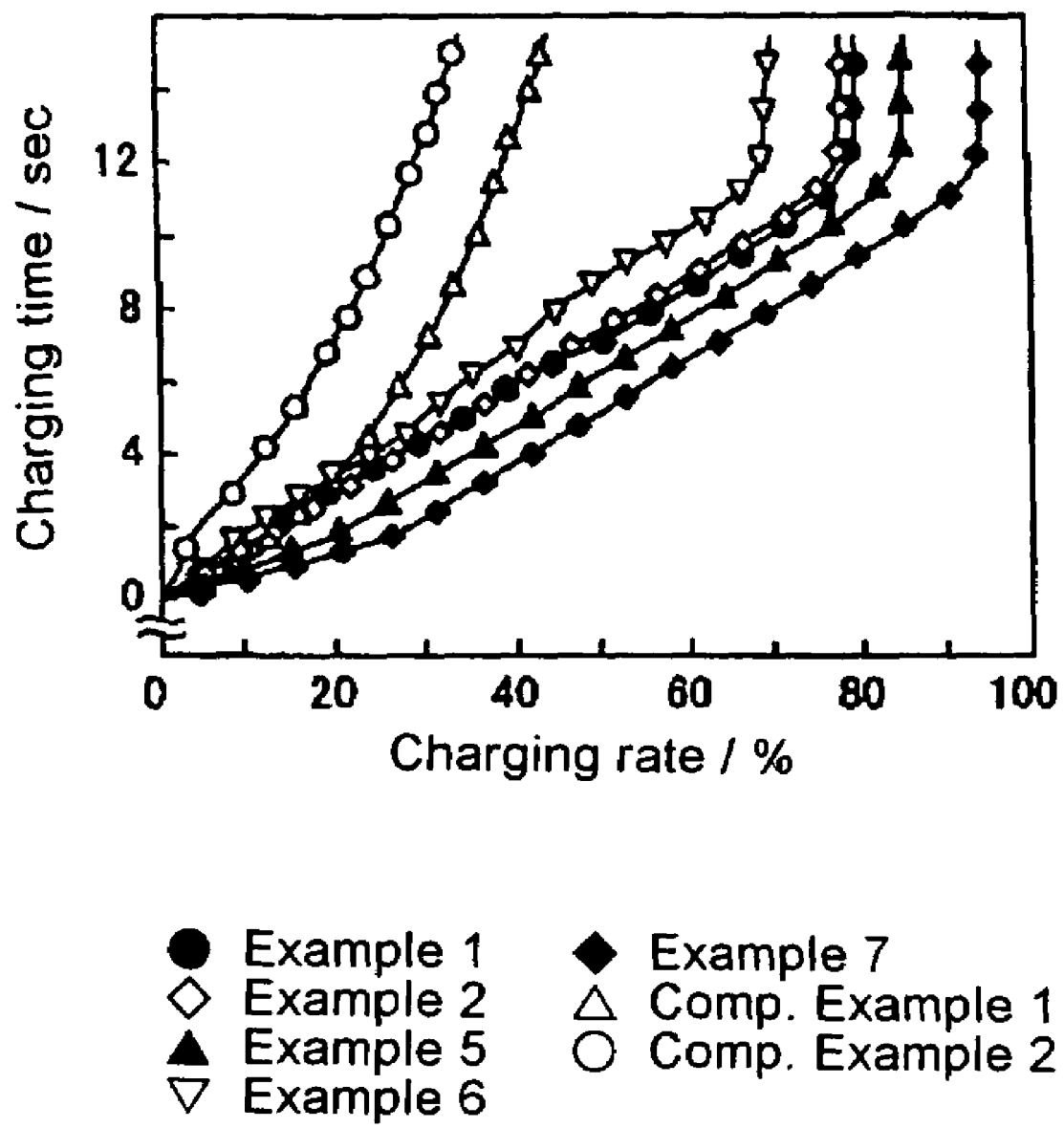
FIG. 6 shows a relationship between a charging rate and a charging time at a charging current of 2000 C in Examples 1 and 2, 5 to 7 and Comparative Examples 1 and 2.
Figure 7:
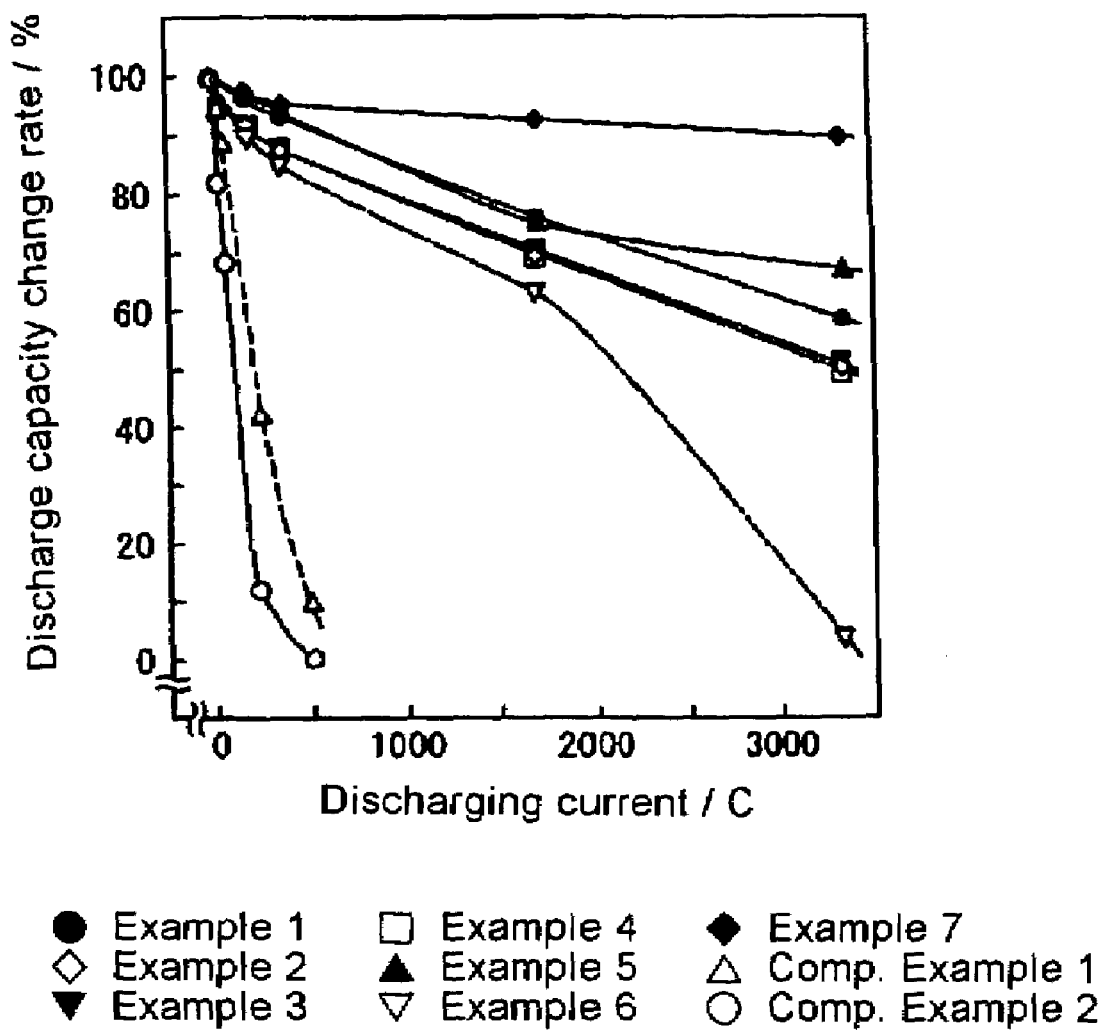
FIG. 7 shows output properties in Examples 1 to 7 and Comparative Examples 1 and 2.

FIG. 5 shows a relationship between a charging rate and a charging time when varying a current value in an electrochemical cell in Example 1. FIG. 6 shows a relationship between a charging rate and a charging time at a charging current of 2000 C in Examples 1 and 2, 5 to 7 and Comparative Examples 1 and 2. FIG. 7 shows output properties Examples 1 to 7 and Comparative Examples 1 and 2. FIG. 8 shows cycle properties of Examples 1, 2, 6 and 7 and Comparative Examples of 1 and 2. These tables and figures unambiguously show the followings.

A discharge capacity change rate in FIG. 7 is a relative value (%) of a discharge capacity at each discharge rate (C) to that at a discharge rate of 1 C. A discharge capacity change rate in FIG. 8 is a relative value (%) of a discharge capacity after a cycle test to that at the initiation of the cycle. The cycle test was conducted under the conditions that CCVD charge at 1.2 V was conducted at a charging current of 5 C for 10 min, CC discharge was conducted at a discharging current of 1 C and a final voltage was 0.8 V.

From the results shown in Tables 1 and 2, it has found that a filling rate varied depending on a porosity in a porous conductive substrate as a support and was reduced as a porosity was reduced. Since with the same electrode thickness, an energy density per a unit weight of an electrode active material is not changed, reduction in a filling rate leads to reduction in an energy capacity of the electrochemical cell. It indicates that the porous conductive substrate preferably has a porosity of 50% or more.

The results shown in FIG. 5 indicate that because increase of a charge/discharging current does not result in significant change in a chargeable/dischargeable quantity of electrical charge in the electrochemical cell in Example 1, the electrode exhibits good response.

The results shown in FIG. 6 indicate that because a charging rate for the same charging time in any Example is larger than that in Comparative Examples, the cell has improved quick charge properties. Since an electrode is thinner in Example 5, quick charge properties are improved compared with Examples 1 and 2, and further such a thinner electrode results in a larger energy density per a unit weight of an electrode active material than that in any of the above Examples as shown in Table 2. Thus, Example 2 shows a higher energy capacity per a certain electrode thickness in an electrochemical cell.

Example 7 shows further improved quick charge properties than Example 5. It is because the amount of the conductive auxiliary is larger than any of the other Examples. Thus, an energy capacity of the electrochemical cell is lower.

The results shown in FIG. 7 indicate that while discharge is limited to 500 C in Comparative Examples, discharge can be conducted at an about 7-fold current rate in any Example and thus output properties are improved in Examples. Examples 6 and 7 show different output properties from those in Examples 1 to 5 because the electrode in Example 6 is a laminate of the porous conductive substrates with a thickness of 80 μm and in the electrode in Example 7, a ratio of the electrode active material to the conductive auxiliary is lower than that in any of the other Examples.

In FIG. 8, Examples 1, 2, 6 and 7 were chosen as Examples because the results in Examples 3 to 5 were substantially equivalent to those in Example 2. The results shown in FIG. 8 indicate that cycle properties are not significantly different among these Examples and a capacity change rate after 1000 cycles is improved about by 20% than that in Comparative Examples.

The electrochemical cells after the above test were disassembled for visually observing the electrodes. In Examples, there were not significant changes in their appearance and no cracks or breaks were observed. In contrast, the electrode in Comparative Example 1 was deteriorated and in some part there were observed defects due to cracks. Such difference in shape stability in an electrode would be one of the factors for improved properties.

Although 5-cyanoindole trimer compound and polyphenylquinoxaline were used as an electrode active material in the above Examples, this invention is not limited to these and any conductive compound having required properties as an electrode active material may be used. In particular, a proton-conducting compound is preferable in the light of increasing an electrochemical cell capacity because a chemical energy can be stored by an oxidation-reduction reaction of such a proton-conducting compound with ions in an electrolytic solution.

What is claimed is:

1. An electrode comprising a porous conductive substrate, an electrode active material, and a conductive auxiliary filled in the pores in the substrate, wherein a ratio of the conductive auxiliary to the electrode active material is 50% by weight or less, wherein the electrode active material is a proton-conducting compound which is subjected to an oxidation-reduction reaction with ions in an electrolyte, said electrode active material being selected from the group consisting of indole π-conjugated compounds, quinones, and quinone polymers.

2. The electrode as claimed in claim 1, wherein the porous conductive substrate is a carbon fiber sheet.

3. The electrode as claimed in claim 1, wherein the porous conductive substrate before filling has a porosity of 50 to 85%.

4. The electrode as claimed in claim 1, wherein the porous conductive substrate has a filling rate of 5% or more.

5. The electrode as claimed in claim 1, comprising at least one of particulate carbon and fibrous carbon as the conductive auxiliary.

6. An electrochemical cell, wherein at least one of electrodes is the electrode as claimed in claim 1.

7. The electrochemical cell as claimed in claim 6, wherein the electrochemical cell is a secondary battery.

8. The electrochemical cell as claimed in claim 6, wherein the electrochemical cell is a capacitor.

9. An electrode comprising:
a conductive thin sheet having a porous structure;
proton-conducting particles; and
conductive auxiliary particles, wherein the proton-conducting particles and the conductive auxiliary particles are dispersed and filled uniformly in the porous structure of the conductive thin sheet, wherein the proton-conducting particles are subjected to an oxidation-reduction reaction with ions in an electrolyte, wherein the conductive auxiliary particles are used less than the proton-conducting particles by weight, said proton-conducting particles being made of an electrode active material selected from the group consisting of indole π-conjugated compounds, quinones, and quinone polymers.

10. The electrode as claimed in claim 9, wherein the conductive thin sheet has a porosity of 50 to 85% before filling.

11. The electrode as claimed in claim 9, wherein the conductive thin sheet is filled with the proton-conducting particles and the conductive auxiliary particles at a filling rate of 5% or higher.

12. The electrode as claimed in claim 9, wherein the conductive thin sheet is a carbon fiber nonwoven sheet.

13. An electrochemical cell comprising electrodes, wherein at least one of said electrodes is the electrode as recited in claim 2.

14. An electrochemical cell comprising electrodes, wherein at least one of said electrodes is the electrode as recited in claim 3.

15. An electrochemical cell comprising electrodes, wherein at least one of said electrodes is the electrode as recited in claim 4.

16. An electrochemical cell comprising electrodes, wherein at least one of said electrodes is the electrode as recited in claim 5.

17. An electrochemical cell for a secondary battery, which comprises the electrode as recited in claim 5.

18. An electrochemical cell for a capacitor, which comprises the electrode as recited in claim 5.

19. An electrode comprising a porous conductive substrate, an electrode active material, and a conductive auxiliary filled in the pores in the substrate, wherein a ratio of the conductive auxiliary to the electrode active material is 50% by weight or less, wherein the electrode active material is a proton-conducting compound which is subjected to an oxidation-reduction reaction with ions in an electrolyte, said electrode active material being selected from the group consisting of poly-p-phenylene, polyphenylene-vinylene, polyperinaphthalene, polyfuran, polyflurane, polythienylene, polypyridinediyl, polyisothianaphthene, polyquinoxaline, polypyrimidine, polyindole, polyaminoanthraquinone, polyimidazole, and derivatives of the foregoing.

20. An electrochemical cell, wherein at least one of electrodes is the electrode as claimed in claim 19.

21. An electrode comprising:
a conductive thin sheet having a porous structure;
proton-conducting particles; and
conductive auxiliary particles, wherein the proton-conducting particles and the conductive auxiliary particles are dispersed and filled uniformly in the porous structure of the conductive thin sheet, wherein the proton-conducting particles are subjected to an oxidation-reduction reaction with ions in an electrolyte, wherein the conductive auxiliary particles are used less than the proton-conducting particles by weight, and wherein the proton-conducting particles are made of an electrode active material selected from poly-p-phenylene, polyphenylene-vinylene, polyperinaphthalene, polyfuran, polyflurane, polythienylene, polypyridinediyl, polyisothianaphthene, polyquinoxaline, polypyrimidine, polyindole, polyaminoanthraquinone, polyimidazole, and derivatives of the foregoing.

22. An electrochemical cell, wherein at least one of electrodes is the electrode as claimed in claim 21.

23. An electrode comprising a porous conductive substrate, an electrode active material, and a conductive auxiliary filled in the pores in the substrate, wherein a ratio of the conductive auxiliary to the electrode active material is 50% by weight or less, wherein the electrode active material is a proton-conducting compound which is subjected to an oxidation-reduction reaction with ions in an electrolyte, said electrode active material being selected from the group consisting of proton-conducting polymers obtained by copolymerizing multiple monomers constituting different polymers or compounds selected from the group consisting of π-conjugated polymers, indole π-conjugated compounds, quinones, and quinone polymers.

24. An electrochemical cell, wherein at least one of electrodes is the electrode as claimed in claim 23.

25. An electrode comprising:
a conductive thin sheet having a porous structure;
proton-conducting particles; and
conductive auxiliary particles, wherein the proton-conducting particles and the conductive auxiliary particles are dispersed and filled uniformly in the porous structure of the conductive thin sheet, wherein the proton-conducting particles are subjected to an oxidation-reduction reaction with ions in an electrolyte, wherein the conductive auxiliary particles are used less than the proton-conducting particles by weight, said proton-conducting particles being made of an electrode active material selected from the group consisting of proton-conducting polymers obtained by copolymerizing multiple monomers constituting different polymers or compounds selected from the group consisting of π-conjugated polymers, indole π-conjugated compounds, quinones, and quinone polymers.

26. An electrochemical cell, wherein at least one of electrodes is the electrode as claimed in claim 25.

* * * * *